United States Patent [19]

Fachini

[11] Patent Number: 4,538,403
[45] Date of Patent: Sep. 3, 1985

[54] NARROW ROW COTTON HARVESTER AND PICKER UNIT

[75] Inventor: Robert M. Fachini, Naperville, Ill.

[73] Assignee: J. I. Case Company, Racine, Wis.

[21] Appl. No.: 636,539

[22] Filed: Aug. 1, 1984

[51] Int. Cl.³ .......................................... A01D 46/18
[52] U.S. Cl. ........................................... 56/44; 56/41
[58] Field of Search ................. 56/12.4, 12.5, 14.3, 56/28, 40, 41, 44, 48

[56] References Cited

U.S. PATENT DOCUMENTS

| | | | |
|---|---|---|---|
| 685,441 | 10/1901 | Campbell | 56/43 |
| 685,442 | 10/1901 | Campbell | 56/43 |
| 1,161,611 | 11/1915 | Calderwood | 56/47 |
| 1,802,022 | 4/1931 | Johnston et al. | 56/13.5 |
| 2,025,514 | 12/1935 | Johnston | 56/41 |
| 2,140,631 | 12/1938 | Johnston | 56/43 |
| 2,259,894 | 10/1941 | Johnston | 56/43 |
| 2,644,285 | 7/1953 | Hulseberg et al. | 56/41 |
| 2,650,462 | 9/1953 | Skaggs | 56/41 |
| 3,088,262 | 5/1963 | Graham | 56/41 |
| 3,108,416 | 10/1963 | Bopf et al. | 56/13.3 |
| 3,169,359 | 2/1965 | Nickla et al. | 56/44 |
| 3,176,451 | 4/1965 | Hubbard | 56/13.2 |
| 3,381,457 | 5/1968 | Hubbard | 56/44 |
| 3,451,201 | 6/1969 | Grichnik | 56/44 |
| 3,512,346 | 5/1970 | Mecklin et al. | 56/44 |
| 3,529,409 | 9/1970 | West | 56/44 |
| 3,757,502 | 9/1973 | Hubbard | 56/28 |
| 4,249,365 | 2/1981 | Hubbard et al. | 56/13.2 |

Primary Examiner—Gene Mancene
Assistant Examiner—John G. Weiss
Attorney, Agent, or Firm—Dressler, Goldsmith, Shore, Sutker & Milnamow, Ltd.

[57] ABSTRACT

A cotton harvester and picker unit is provided for the harvesting of narrow spaced row cotton. The cotton harvester is provided with novel picker units which overlap one another to reduce the total lateral width of the cotton harvester. The inventive harvesting units are also elongated in the direction of the travel to reduce the transverse width. The picker units also have a composite post assembly, compressor sheet and plant lifter which allows for quick disassembly without hand or power tools. Removal of the front post assembly provides easier access to the rotors for maintenance or removal of chokes.

10 Claims, 6 Drawing Figures

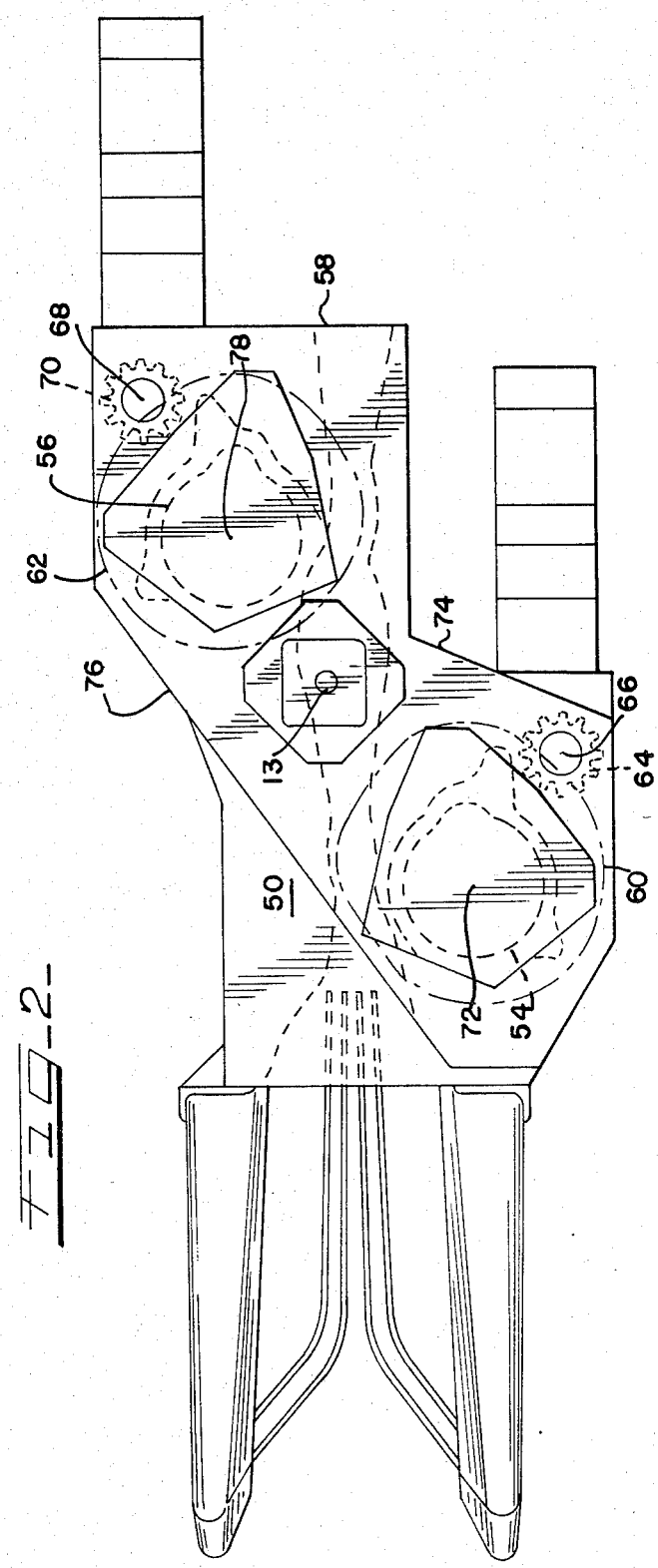

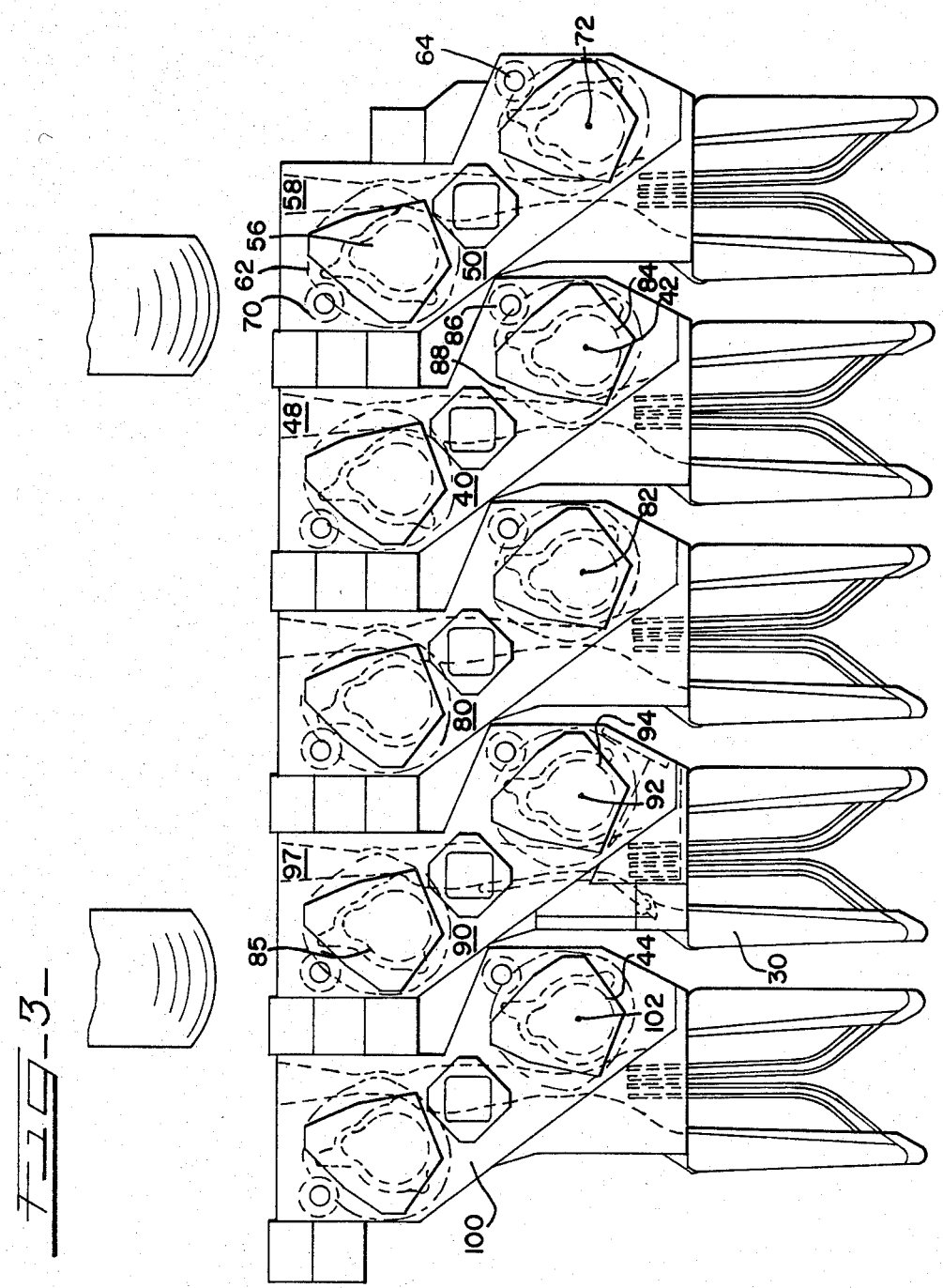

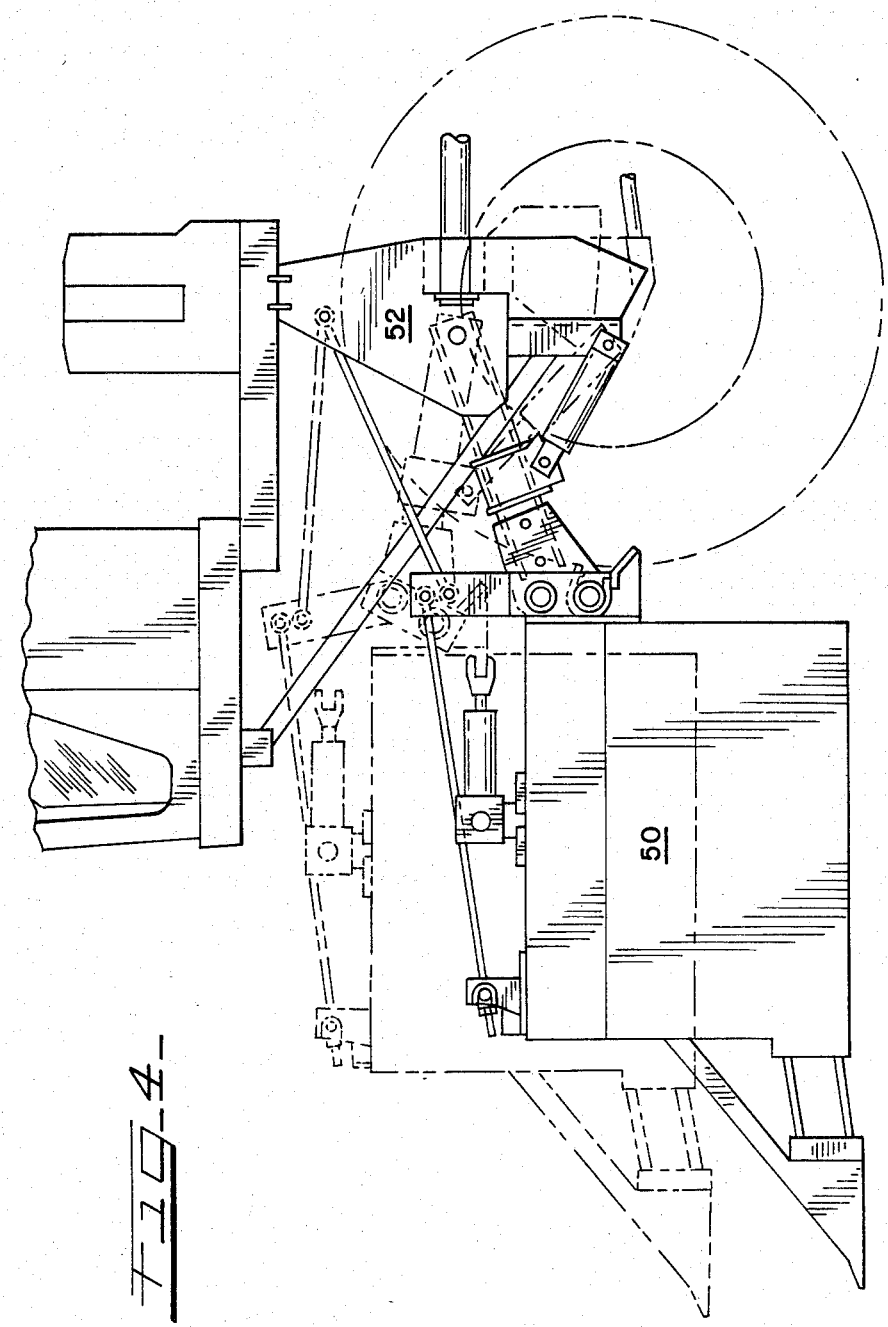

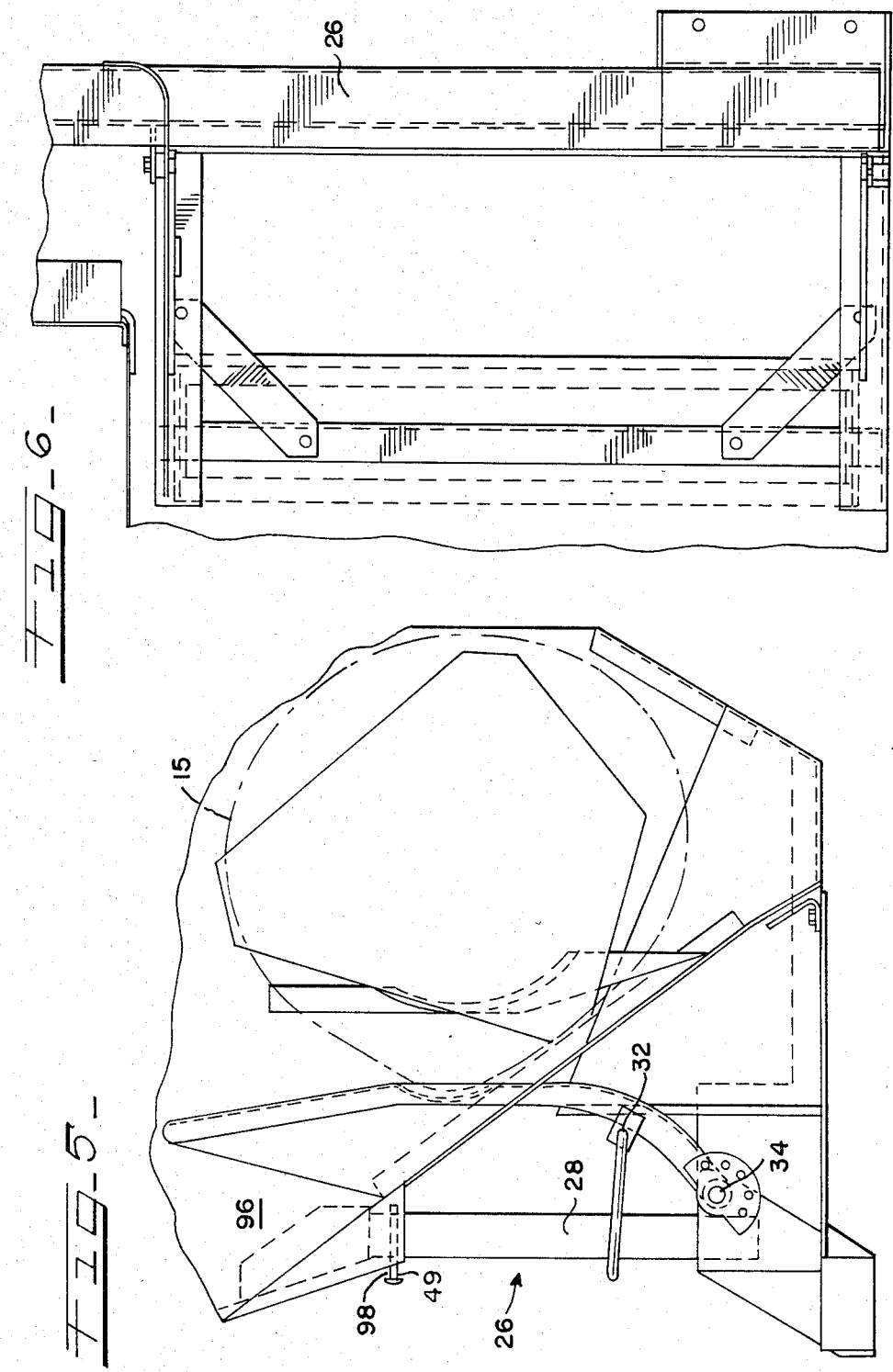

NARROW ROW COTTON HARVESTER AND PICKER UNIT

FIELD OF THE INVENTION

The present invention relates to cotton harvesting machines which employ a picker rotor and associated doffer. The present invention also concerns a novel arrangement for a cotton harvester harvesting drum. More particularly, the present invention relates to picker harvesting machines suitable for harvesting parallel rows of cotton wherein the rows are spaced less than forty inches apart.

BACKGROUND OF THE INVENTION

Cotton pickers typically harvest one to four rows of cotton with the rows spaced at least thirty eight or forty inches apart. An example of a typical picker type cotton harvester machine is described in copending U.S. application "Cotton Harvester Harvesting Unit Support System", Covington et al. Ser. No. 619,094, filed June 11, 1984 and Hubbarb et al. U.S. Pat. No. 4,249,365 (disclosures incorporated by reference herein). The cotton harvester typically has a wheel frame with a receptacle mounted on top. Typically mounted in front of the cotton harvester are the harvesting units, often referred to as picker units or drums. Each drum is provided with a forward and rear picker spindle rotors transversely separated by a fore-and-aft plant passage.

DISCLOSURE STATEMENT

Prior to the present invention the drums were too wide to harvest two consecutive parallel rows of narrow row cotton planted in the typical range of thirty inches apart. To harvest cotton in very narrow rows two approaches were utilized. One approach was to harvest one row at a time, although usually technically feasible this approach is limited to single row harvesters. A second approach was to harvest alternating rows skipping over the middle row. A two row machine would be modified to harvest alternating rows. On one pass the modified cotton harvesting machine would harvest the first and third rows. On a returning pass the modified cotton harvesting machine would harvest a second and fourth row. This approach is again less efficient requiring two passes instead of one. The above-noted approach is also undesirable when harvesting picker type cotton because the machine passes over the cotton in a non-harvesting pass possibly causing damage to the cotton plants.

SUMMARY OF THE INVENTION

To overcome the disadvantages of prior attempts to harvest narrow spaced row cotton with picker type harvesting machines, the present invention is brought forth. The present invention provides a picker type cotton harvester wherein the drum units are allowed to transversely overlap or nest with one another. The nesting arrangement is allowed by the novel elongated diagonal design of the drum units.

The drum structure also has a novel front post structure. The front post structure allows a portion of the plant lifter and compressor sheet to be removed as one complete assembly. Removal of the front post assembly allows access to the rear rotor and associated moistener post and the adjoining drum front rotor and associated moistener post for maintenance or cleaning cotton jams. Still another advantage of the present invention is that it allows the cotton harvester to have drums of a single hand orientation. By eliminating left-hand and/or right-hand drums, almost all of the drum parts for the whole machine become interchangeable.

It is an object of the present invention to provide a picker type cotton harvester for narrow spaced row cotton. It is an object of the present invention to provide a drum structure wherein the drums can be transversely nested together. It is a desire of the present invention to provide a post assembly which allows easier access to the rear rotor of the drum and to the front rotor of an adjoining drum. It is a desire of the present invention to provide a post assembly with a hinged pressure plate which can be removed as an integral unit.

Other objects, desires and advantages of the present invention will become apparent to those skilled in the art as the nature of the invention is better understood from the accompanying drawings and detailed description.

BRIEF DESCRIPTION OF THE DRAWINGS

FIG. 2 is a top elevational view showing the configuration of the inventive drum structure with the cotton ducts removed for clarity of illustration;

FIG. 3 is a top elevational view of the inventive cotton harvester set for the harvesting of thirty inch row cotton;

FIG. 4 is a partial side elevational view illustrating the drum mounting system;

FIG. 5 is an enlarged partial top elevational view of the inventive drum unit illustrating the post assembly in greater detail; and FIG. 6 is a side elevational view of the post assembly with the plant lifter removed.

DETAILED DESCRIPTION OF THE DRAWINGS

Figure 1:
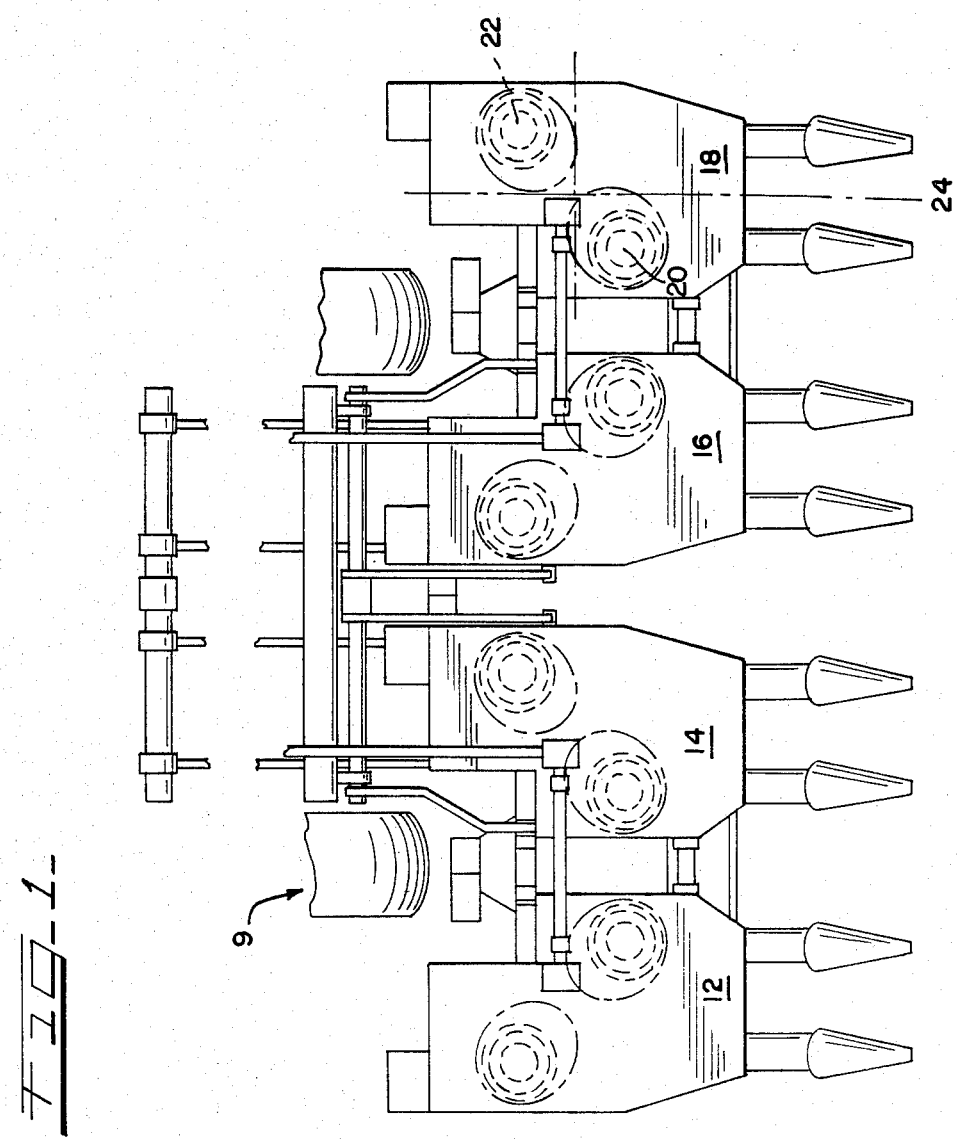
FIG. 1 is a partial top elevational view of a cotton harvester illustrating a typical drum configuration for harvesting forty inch row cotton prior to the present invention.

Referring to FIG. 1, the four drum units 12, 14, 16, and 18 respectively of the cotton harvester 9 are transversely spaced for harvesting parallel rows of cotton forty inches apart. Typically drums are numbered from the operator's view from left to right, providing first, second, third and fourth drums. The second drum designated as item 16 is referred to as a left-hand drum, being to the immediate left of the operator (from the center line of the cotton harvester). The third drum designated as item 14 is referred to as the right-hand drum. The fourth drum designated as item 12 is considered to be a left-hand drum since this configuration is substantially identical to the second drum 16, and likewise the first drum 18 is designated as a right-hand drum. Typically, drums are provided in the right and left-hand configuration to provide balance for the cotton harvesters.

First drum 18 is provided with front and rear spindle rotors 20 and 22 respectively, transversely separated by a fore-and-aft plant passage 24. Each rotor is also provided with an associated doffer (not shown) for removing the cotton from the spindle rotor. The second 16, third 14 and fourth 12 drums are constructed in a similar manner.

In the cotton harvester illustrated in FIG. 1, the width of the drums prevent the drums from being transversely spaced closer together to operate in narrow row cotton fields.

Referring to FIGS. 3 and 4, the inventive drum unit 50 of the present invention is pivotally mounted forwardly from the cotton harvester frame 52 in a similar manner as illustrated and explained in copending and coassigned U.S. patent application Covington et al. "Cotton Harvester Harvesting Unit Support System" filed June 11, 1984 (Ser. No. 619,094).

Referring to FIGS. 2 and 3, drum 50 has a forward 54 and rear rotor 56 transversely separated by a fore-and-aft plant passage 58. The forward and rear rotors are directly or indirectly powered by a vertical input shaft 13. The rear rotor orbit 62 is totally rearward the forward rotor orbit 60.

The forward doffer 64 rotational axis 66 is laterally spaced from the fore-and-aft plant passage 58 within a line which is both parallel to the fore-and-aft plant passage and tangent with the forward rotor orbit 60. In the embodiment of the drum illustrated in FIGS. 2 and 3, the total circumference of the doffer 64 is laterally spaced within the line which is both parallel to the fore-and-aft plant passage 58 being tangent to the forward rotor orbit 60. Also, the rotational axis 66 of forward doffer 64 is spaced from the fore-and-aft plant passage beyond a line which is parallel to the fore-and-aft plant passage and intersecting with the rotational axis 72 of the forward rotor 54. Rear doffer 70 is spaced from plant passage 58 as described for forward doffer 64.

The doffer's rotational axes 66 and 68 are rearward of the rotational axes of their respectie rotors 72 and 78.

The top plate 74 of the drum has a front side 76 extending over the fore-and-aft plant passage 58 which is inclined from front to rear along a line approximately parallel to a line drawn between the rotational axis of the forward and rear picker rotors 72 and 78 respectively.

The cotton harvester of FIG. 3 has five drums 50, 40, 80, 90, 100 whose configuration is substantially identical to one another. Fore-and-aft plant passage 48 is spaced approximately 30 inches from fore-and-aft plant passage 58. The rotational axes of the drum rotors 72,42 82, 92 and 102 are transversely aligned. When harvesting narrow row cotton the drums are mounted to overlap or nest with one another. A line parallel to the fore-and-aft plant passage 58 tangent to the rear rotor orbit 62 intersects with the forward rotor orbit 88 of the adjoining drum 40. In the embodiment illustrated in FIG. 3, it is possible to draw a line parallel to the fore-and-aft plant passage 58 intersecting with the rear rotor orbit 62 rear doffer 70, forward doffer 86 of drum 40 and the forward rotor orbit 88 of the first unit. The overlapping of the rotors 56 and 84 allows the drums 50 and 40 to be nested in a more transversely compact manner. Therefore, the harvesting machine can be utilized for narrow row harvesting that is not possible with conventional cotton harvesting machines.

Another advantage of the inventive drum is that there is no longer a need to fabricate drum units in opposite hand configuration, therefore eliminating parts required for opposite hand drums.

If desired, a drum may be removed and the remaining drums can be transversely respaced to harvest conventionally spaced row cotton.

Referring to FIGS. 3, 5 and 6 a post assembly 26 projects forwardly from the drum 90 main housing 96. The post assembly 26 is laterally spaced from the rotor 94 opposite the fore-and-aft plant passage 97 and has a quick connector 98 which comprises a plurality of pins 49.

The pressure plate assembly 32 is pivotally connected to the post member 28 at point 34 and can be removed integrally with the post member 28. Pressure plate assembly 32, has a preset tension guide and urges the cotton plant towards rotor orbit 15 of rotor 94. Projecting forwardly from post member 28 is half of the plant lifter 30, which may also be removed along integrally with the post member 28. The plant lifter 30 aids in guiding the cotton plants into the fore-and-aft plant passage 97. Post assembly 26 may be removed without the use of hand tools in order to facilitate reaching the forward rotor 94 in case of cotton clogs. Also, removal of the post assembly 26 when the drums 90 and 100 are mounted to the cotton harvester for narrow row harvesting, allows access to the forward rotor 44 and its front moistener pad of the drum 100 for maintenance or cotton clogs. Also removal of post assembly 26 allows easier access to the moistener pad for rear rotor 85. Therefore, the drum 90 does not have to be removed for many common maintenance tasks to the forward rotor 44, even when the harvester is being utilized on narrow row cotton.

The integral removal of the pressure plate assembly 32 with the post member 28 allows the pressure plate assembly tension and distance from the forward rotor 94 to be preset and maintained upon reassembly of post member 28 to the drum 90. Therefore, readjustment of the pressure plate assembly's distance from the rotor 94 or the tension of the pressure plate assembly is not required.

While a few embodiments of the present invention have been explained, it will be readily apparent to those skilled in the art of the various modifications which can be made to the present invention without departing from the spirit and scope of this invention as encompassed by the following claims.

What is claimed is:

1. A multi-row picker cotton harvester comprising:
    a first drum unit with a first fore-and-aft plant passage, said first drum unit including:
        a first forward picker rotor with a rotational axis and orbit on a first side of said first fore-and-aft passageway; and
        a first rear picker rotor with a rotational axis and orbit on the side of said first fore-and-aft passageway opposite said first side; and
    at least a second drum unit with a second fore-and-aft plant passage including a second forward picker rotor with an orbit, wherein a line being generally parallel to said second fore-and-aft passageway and tangent with said second forward picker rotor orbit intersects said first rear rotor orbit.

2. A cotton harvester as described in claim 1, wherein the rotational axis of said first forward rotor and said second forward rotor are transversely aligned.

3. A multi-row picker cotton harvester comprising:
    a first drum unit with a first fore-and-aft plant passage including:
        a first forward picker rotor and associated doffer, said first forward rotor having a rotational axis on a first side of said first fore-and-aft passage;
        a first rear picker rotor and associated doffer, said first rear rotor having a rotational axis and orbit on the side of said first fore-and-aft passage opposite said first side; and at least a second drum unit with a second fore-and-aft plant passage including:
a second forward picker rotor and associated doffer, said second forward doffer being situated such that a line parallel to said first fore-and-aft passage intersecting with the rotational axis of said second forward doffer is also intersecting with said first rear rotor orbit.

4. A cotton harvester as described in claim 3, wherein the rotational axis of said first forward rotor and said second forward rotor are transversely aligned.

5. A multi-row picker cotton harvester comprising:
a first drum unit with a first fore-and-aft plant passage including:
a first forward picker rotor with a rotational axis and orbit on a first side of said fore-and-aft passageway;
a first forward doffer for removing cotton from said first forward rotor;
a first rear picker rotor with a rotational axis and orbit on the side of said fore-and-aft passageway opposite said first side; and
a first rear doffer for removing cotton from said first rear rotor; and
at least a second drum unit with a second fore-and-aft plant passage, said second drum unit including:
at least a second forward picker rotor being situate such that a line drawn generally parallel to said first fore-and-aft passage and tangent to said first rear doffer intersects with the orbit of said second forward picker rotor; and
a second forward doffer for removing cotton from said second forward rotor, said second forward doffer being situated such that a line can be drawn parallel to said first fore-and-aft passage intersecting with a portion of said first rear doffer and intersecting with said second forward doffer.

6. A cotton harvester as described in claim 5, wherein the rotational axis of said first forward rotor and said second forward rotor are transversely aligned.

7. A multi-row picker cotton harvester comprising:
a first drum with a first fore-and-aft plant passage including:
a first forward picker rotor and associated doffer;
a first rear picker rotor and associated doffer, said first rear rotor having a rotational axis and orbit on the side of said first fore-and-aft plant passage opposite said first forewared rotor;
at least a second drum unit with a second fore-and-aft plant passage including;
a second forward picker rotor with an orbit and associated doffer, and wherein a line parallel to said first fore-and-aft plant passage intersects the orbits of said first rear rotor and said second forward rotor, and said line also intersects said first rear and said second forward doffers.

8. A cotton harvester as described in claim 7, further comprising transversely aligned first and second forward rotor rotational axis.

9. A picker cotton harvester having a plurality of dual rotor drum units said harvester comprising:
a first drum unit including:
a drum housing with a first fore-and-aft plant passage;
a forward picker rotor with a rotational axis and orbit on a first side of said first fore-and-aft passageway;
a first forward doffer for removing cotton from said first forward rotor, said first forward doffer having a rotational axis laterally spaced from said first fore-and-aft passage within a line which is both parallel to said first fore-and-aft passage and tangent with the orbit of said first forward rotor;
a first rear picker rotor diagonally adjacent said first forward rotor with a rotational axis and orbit on a side of said fore-and-aft passage opposite said first forward rotor, said first rear picker rotor orbit being totally rearward of said first forward picker rotor orbit; and
a first rear doffer for removing cotton from said first rear rotor, said first rear doffer having a rotational axis laterally spaced from said first fore-and-aft passage within a line which is both parallel of said first fore-and-aft passage and tangent with the orbit of said first rear rotor; and
at least a second drum unit said second drum unit including:
a drum housing with a second fore-and-aft plant passage;
a second forward picker rotor with a rotational axis and orbit on a first side of said second fore-and-aft passage, and a line which is both parallel to said first fore-and-aft passage and tangent to said second forward rotor orbit intersects the orbit of said first rear rotor;
a second forward doffer for removing cotton from said second forward rotor, said second forward doffer having a rotational axis laterally spaced from said second fore-and-aft passage within a line which is both parallel to said second fore-and-aft passage and tangent with the orbit of said second forward rotor;
a second rear picker rotor diagonally adjacent said second forward rotor with a rotational axis and orbit on the side of said second fore-and-aft passage opposite said second forward rotor, said second rear rotor orbit being totally rearward of said second forward picker rotor orbit; and
a second doffer for removing cotton from said second rear rotor, said second rear doffer drum having a rotational axis laterally spaced from said second fore-and-aft passage within a line which is both parallel of said fore-and-aft passage and tangent with the orbit of said second rear picker rotor.

10. A multi-row picker cotton harvester comprising:
a drum unit assembly including,
a first drum unit defining a first fore-and-aft plant passage comprising
a first forward picker rotor rotatably supported relative to said assembly and defining an orbit on a first side of said first fore-and-aft passageway; and
a first rear picker rotor rotatably supported relative to said assembly and defining an orbit on the side of said first fore-and-aft passageway opposite said first side; and
at least a second drum unit defining a second fore-and-aft plant passage including a second forward picker rotor rotatably supported relative to said assembly and a second rear picker rotor, said second forward picker rotor being disposed adjacent said first rear picker rotor and defining an orbit, said first rear rotor and second forward rotor being constructed and arranged so that a line drawn generally parallel to said second fore-and-aft passageway and tangent with said second forward picker rotor orbit intersects said first rear rotor orbit.

* * * * *